US005982744A

United States Patent [19]
Cantwell et al.

[11] Patent Number: 5,982,744
[45] Date of Patent: Nov. 9, 1999

[54] HIGH DENSITY UNIT SHELF AND METHOD

[75] Inventors: Robert W. Cantwell, Garland; Michael H. Jette, Grapevine, both of Tex.

[73] Assignee: Alcatel USA Sourcing, L.P., Plano, Tex.

[21] Appl. No.: 08/911,305

[22] Filed: Aug. 14, 1997

[51] Int. Cl.[6] .................................................. H04L 12/30
[52] U.S. Cl. ................... 370/217; 370/386; 340/825.79; 379/279
[58] Field of Search ..................................... 370/216, 217, 370/220, 357, 360, 387, 401, 465, 466, 467, 386; 714/1, 2, 3, 4; 340/825.8, 825.79; 379/268, 269, 279

[56] References Cited

U.S. PATENT DOCUMENTS

| 5,220,600 | 6/1993 | Chouanard et al. | 379/327 |
|---|---|---|---|
| 5,436,890 | 7/1995 | Read et al. | 370/352 |
| 5,526,359 | 6/1996 | Read et al. | 370/516 |
| 5,631,902 | 5/1997 | Yoshifuji | 370/388 |
| 5,790,519 | 8/1998 | Hanson et al. | 370/220 |
| 5,901,136 | 5/1999 | Lovelace et al. | 370/217 |

OTHER PUBLICATIONS

Advertisement, Alcatel Telecom Products & Networks "1630 SX Narrowband Cross Connect" 1 page from World Wide Web Site at www.alcatel.com.

*Primary Examiner*—Alpus H. Hsu
*Assistant Examiner*—Mitchell Slavitt
*Attorney, Agent, or Firm*—Baker & Botts, L.L.P.

[57] ABSTRACT

A high density unit shelf (22) is provided for use with a digital switch such as a digital cross-connect system (10). The high density unit shelf (22) provides redundant interfacing capability and may be configured in a redundant configuration, a non-redundant configuration, or combinations thereof. The high density unit shelf (22) generally includes a plurality of network interface port pairs, such as a network interface port (52) and (56), a plurality of network connectors, such as a receive network connector (50) and a transmit network connector (54), a plurality of first matrix connectors, such as a matrix connector (70), and a plurality of second matrix connectors such as a matrix connector (72). The network interface port pair receives a first network interface card at the network interface port (52) and a second network interface card at the network interface port (56).

38 Claims, 2 Drawing Sheets

HIGH DENSITY UNIT SHELF AND METHOD

TECHNICAL FIELD OF THE INVENTION

This invention relates in general to the field of telecommunications and more particularly to a high density unit shelf and method for manufacturing.

BACKGROUND OF THE INVENTION

The demand for high capacity and reliable telecommunications networks continues to grow as network and service providers upgrade their networks to provide more and increasingly advanced telecommunications services. In particular, the demand for high capacity and reliable digital cross-connect systems continues to grow. A digital cross-connect system is a specialized type of high-speed digital data and voice channel switch that is partitioned using specific instructions or commands that are separate from the normal signaling network and independent of any information that may flow through the cross-connect system. Reliability and availability are of paramount importance in these systems.

Unfortunately, digital cross-connect systems are often inflexible and have a limited line capacity that is difficult to increase or expand. This presents problems as a telecommunications network expands and the line capacity of the existing digital cross-connect system is met or exceeded. Generally, a telecommunications network designer or planner has no choice but to either replace the existing digital cross-connect system with an entirely new system, having a greater capacity, or to buy an additional digital cross-connect system to work in tandem with the existing digital cross-connect system. Both of these options are expensive, time consuming to install and administer, and often cause an interruption in service. Furthermore, there are often physical space limitations that prevent the location of additional telecommunications hardware such as a digital cross-connect system. As a result, the incremental cost to upgrade a telecommunications system far exceeds any immediate or near-term incremental revenues that will be realized to offset the upgrade cost.

Inflexible digital cross-connect systems present problems when maintenance is needed on the network interface card of a particular circuit or connection. The maintenance of the network interface card often makes the particular circuit or connection unavailable which reduces the overall availability of the circuit or connection.

SUMMARY OF THE INVENTION

From the foregoing it may be appreciated that a need has arisen for a high density unit shelf and method for manufacturing that allows a user to significantly increase the capacity of an existing digital switch, such as a digital cross-connect system, without having to install an entirely new cross-connect system while improving overall system reliability and availability. In this manner, incremental upgrade costs can be minimized and will more closely track incremental increases in revenue as new services and users are added to the telecommunications network. In accordance with the present invention, there is provided a high density unit shelf and method for manufacturing that substantially eliminate and reduce the disadvantages and problems associated with expanding the capacity of a digital switch such as a digital cross-connect system.

According to an aspect of the present invention, a high density unit shelf is provided for use with a digital cross-connect system of a telecommunications network and having redundant interfacing capability. The high density unit shelf includes a network interface port pair, a network connector, a first matrix connector, and a second matrix connector. The network interface port pair includes a first network interface port and a second network interface port, each for receiving a corresponding network interface card. The network connector receives an inbound telecommunications signal in a first format from a network and couples the inbound telecommunications signal to the first network interface port and the second network interface port. The network connector also receives an outbound telecommunications signal in the first format from the first network interface port and the second network interface port and provides the outbound telecommunications signal to the network.

The first matrix connector receives an inbound telecommunications signal in a second format from the first network interface port and an inbound telecommunications signal in the second format from the second network interface port and provides one of the inbound telecommunications signal to a first matrix of the digital cross-connect system. The first matrix connector also receives an outbound telecommunications signal in the second format from the first matrix and provides the outbound telecommunications signal from the first matrix to the first network interface port and the second network interface port.

The second matrix connector receives the inbound telecommunications signal in the second format from the first network interface port and the inbound telecommunications signal in the second format from the second network interface port and provides one of the inbound telecommunications signal to a second matrix of the digital cross-connect system. The second matrix connector also receives an outbound telecommunications signal in the second format from the second matrix and provides the outbound telecommunications signal from the second matrix to the first network interface port and the second network interface port.

The present invention provides robust solution with a multitude of technical advantages. One technical advantage of the present invention includes the capability to easily and inexpensively upgrade the capacity of an existing digital switch, such as a digital cross-connect system, while increasing overall system reliability and availability. The reliability and availability are increased by providing physically redundant paths for inbound telecommunications signals and outbound telecommunications signals while providing a path for information to be exchanged between the two network interface ports of each network interface port pair. Another technical advantage of the present invention includes the flexibility to configure the high density unit shelf in such a manner as to minimize incremental costs as the capacity of the associated digital cross-connect system expands. Yet another technical advantage includes the capability to interface network signals provided at a variety of different signal formats and rates to the digital cross-connect system using the high density unit shelf of the present invention. Still yet another technical advantage of the present invention includes the capability to operate in either a redundant mode or a non-redundant mode. Yet another technical advantage includes the capability to upgrade the capacity of a digital switch, such as a digital cross-connect system, with a high density unit shelf that consumes minimal floor space. Another technical advantage of the present invention includes the capability to keep a circuit or connection in service while performing maintenance on the network interface card of the circuit or connection while still maintaining the circuit or connection in service, thus significantly increasing overall availability and reliability. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
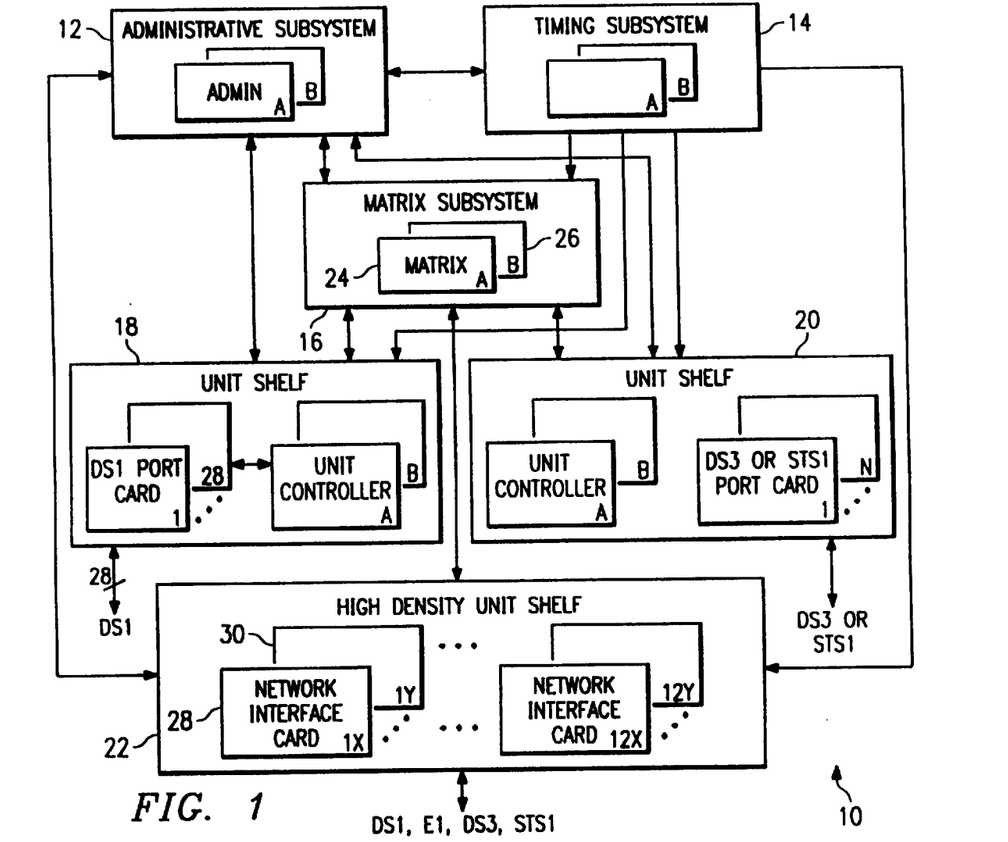
FIG. 1 is an overview diagram illustrating an exemplary digital cross-connect system of a telecommunications network.

FIG. 1 is an overview diagram illustrating an exemplary digital cross-connect system 10 of a telecommunications network. Digital cross-connect system 10 may receive, switch, and communicate digital telecommunications signals in any of a variety of a different formats such as the digital signal, level one (DS1) format; the digital signal, level three (DS3) format; the E-1 format; and the synchronous transport signal level one (STS-1) format. Internally, digital cross-connect system 10 performs digital switching at the digital signal, level zero (DS0) rate or format. Digital cross-connect system 10 includes various subsystems and unit shelves such as an administrative subsystem 12, a timing subsystem 14, a matrix subsystem 16, a unit shelf 18, a unit shelf 20, and a high density unit shelf 22. Unit shelf 18, unit shelf 20 and high density unit shelf 22 couple through their respective port cards or network interface cards to individual telecommunications networks or subnetworks so that inbound telecommunications signals may be received by digital cross-connect system 10 from these networks and so that outbound telecommunications signals may be communicated by digital cross-connect system 10 to these networks.

Generally, the administrative subsystem 12 includes redundant administrative subsystems A and B that are used to control the overall operation and configuration of digital cross-connect system 10. Each administrative subsystem will generally include a microprocessor and will function as a computer to control the operation of digital cross-connect system 10. For example, administrative subsystem 12 exchanges redundant control signals with unit shelf 18, unit shelf 20, and high density unit shelf 22 so that the various port cards, unit controllers, and network interface cards can be properly configured by administrative subsystem 12. The redundant configuration of administrative subsystem 12 results in increased overall system reliability and availability.

Administrative subsystem 12 performs operation, administration, maintenance, and provisioning (OAM&P) functions for digital cross-connect system 10. In this manner, an operator of digital cross-connect system 10 may configure the system using a terminal provided from administrative subsystem 12. For example, a craftsperson or operator may access a terminal of administrative subsystem 12 and provide provisioning information so that certain ports are connected to other ports to provided dedicated or provisioned communications paths. In this manner, administrative subsystem 12 sends control and provisioning information to the various unit shelves as needed to properly configure the various port cards, unit controllers, and network interface cards to provision desired inter-connections.

Administrative subsystem 12 also exchanges control information with matrix subsystem 16 to assist with the actual switching operations. Matrix subsystem 16 includes a redundant switching fabric that includes a switching fabric 24 and a switching fabric 26. Switching fabric 24 may be referred to as a first matrix and switching fabric 26 may be referred to as a second matrix. This redundant switching fabric enhances the overall reliability and availability of digital cross-connect system 10. Matrix subsystem 16 provides point-to-point connectivity and point-to-multipoint connectivity while performing switching at the DS0 rate or format. Timing subsystem 14 provides redundant timing signals to the various components of digital cross-connect system 10, including administrative subsystem 12. The redundant timing signals enhance overall system reliability and availability.

Unit shelf 18, in the one embodiment illustrated in FIG. 1, allows up to twenty-eight DS1 port cards to be included so that twenty-eight DS1 signals may be exchanged with associated networks and subnetworks and digital cross-connect system 10. Each port card of unit shelf 18 can convert the telecommunications signals between the DS1 format and a corresponding format, such as a proprietary format, compatible with digital cross-connect system 10. In one embodiment, the proprietary format provides information at the DS0 rate so that the information or telecommunications signal can be switched using matrix subsystem 16 and communicated to a port card or network interface card of one of the unit shelves of digital cross-connect system 10 as an outbound telecommunications signal. The proprietary format may be any available format such as the proprietary format used in DSC digital cross-connect systems. The proprietary format used in these systems provides the information at a DS0 rate so that matrix subsystem 16 may appropriately switch the signal.

Unit shelf 18, through its various port cards, may receive an inbound telecommunications signal in the DS1 format from an associated network, convert the inbound telecommunications signal to a proprietary format, as mentioned above, and communicate the inbound telecommunications signal to matrix subsystem 16 for switching. Unit shelf 18 may also receive an outbound telecommunications signal in the proprietary format from matrix subsystem 16, convert the outbound telecommunications signal to the DS1 format, and communicate the outbound telecommunications signal to an associated network or subnetwork coupled to unit shelf 18. This operation is controlled by redundant unit controllers, as shown in FIG. 1.

Unit shelf 20 functions similarly to unit shelf 18 except that unit shelf 20, in the embodiment shown in FIG. 1, provides interfaces at either the DS3 format or the STS-1 format so that higher rate and differently formatted telecommunications signals may be exchanged with digital cross-connect system 10. Unit shelf 20 includes redundant unit controllers and a plurality of port cards as illustrated. The port cards may be provided as either DS3 or STS-1 port cards. In this manner, either a DS3 or an STS-1 formatted inbound telecommunications signal may be received at a corresponding port card of unit shelf 20 and converted to the proprietary format so that the information of the inbound telecommunications signal may be provided at the DS0 rate to matrix subsystem 16 for switching. Similarly, an outbound telecommunications signal may be received at unit shelf 20 from matrix subsystem 16 in the proprietary format and converted to either the DS3 or the STS-1 format so that the outbound telecommunications signal may be provided to the attached network. The operation of unit shelf 20 is controlled by the redundant unit controllers.

High density unit shelf 22 provides the capability to use a variety of different network interface cards to redundantly exchange telecommunications signals with digital cross-connect system 10 in a variety of different formats such as the DS1, El, DS3, and STS-1 formats. For example, an El network interface card may receive an inbound telecommunications signal from an attached network in the E1 format, convert the inbound telecommunications signal to the proprietary format used by matrix subsystem 16, and communicate the inbound telecommunications signal to matrix subsystem 16. Conversely, the E1 network interface card may receive an outbound telecommunications signal from matrix subsystem 16 in the proprietary format, convert the outbound telecommunications signal to the E1 format, and communicate the outbound telecommunications signal to the attached network. Note that high density unit shelf 22 does not use or need separate unit controller cards or circuitry such as those used in unit shelf 18 and unit shelf 20.

The architecture of high density unit shelf 22 is such that a large number of high rate telecommunications signals may be exchanged with digital cross-connect system 10 as compared with unit shelf 18 and unit shelf 20, hence the label "high density." Furthermore, high density unit shelf 22 occupies the same or less physical space than either unit shelf 18 or unit shelf 20 while providing the capability to exchange much larger amounts of information with digital cross-connect system 10.

High density unit shelf 22, illustrated more fully in FIGS. 2 through 4 and described more fully below, includes a plurality of network interface port pairs that includes a first network interface port and a second network interface port located adjacent to one another. Each network interface port pair couples through a network connector to exchange telecommunications signals with an associated network and a matrix connector to exchange telecommunications signals with switching fabric 24 and switching fabric 26 of matrix subsystem 16. The matrix connector may be implemented as a first and a second matrix connector.

The first network interface port of each network interface port pair may receive a first network interface card, and the second network interface port of each network interface port pair may receive a second network interface card. The first network interface card and the second network interface card of a particular network interface port pair will be identical or redundant network interface cards that generally may be interchanged with each other and are used to redundantly process both inbound and outbound telecommunications signals. For example, a network interface card 28 is provided and is illustrated with the designation "1X" because of its position in a first network interface port. Similarly, a network interface card 30 is shown and is illustrated with the designation "1Y" because of its position in a second network interface port. In this manner, high density unit shelf 22 may be populated with a plurality of network interface card pairs that are provided in a first network interface port, such as network interface card 28, and a second network interface port, such as network interface card 30, that increases overall system reliability and availability. Any number of network interface card port pairs may be provided in high density unit shelf 22 such as the twelve network interface card pairs illustrated in FIG. 1.

It should be noted that each of the network interface cards of high density unit shelf 22 will include processing circuitry and control circuitry such that high density unit shelf 22 does not need an associated unit controller card to control the flow and conversion of inbound and outbound telecommunications signals through the various network interface cards of high density unit shelf 22. In this manner, the reliability and availability of high density unit shelf 22 is increased as processing capability is distributed more evenly without the need to rely on a single or redundant unit controller.

High density unit shelf 22 may be configured in either a redundant configuration, a non-redundant configuration, or a combination thereof. The redundant configuration increases overall reliability and availability by providing two identical or redundant network interface cards to process the same inbound and outbound telecommunications signals in parallel. Compared to the non-redundant configuration, the redundant configuration increases overall costs because of the need for two network interface cards, yet, in some applications, the increased reliability and availability are so critical that the only available option is the redundant configuration. The redundant configuration is illustrated more fully in FIG. 2.

However, certain telecommunications customers may not demand or require the increased reliability and availability offered by the redundant configuration and may prefer the less expensive non-redundant configuration. The non-redundant configuration provides a single network interface card per network interface port pair and hence is less expensive than operating in the redundant configuration. In this manner, only a single network interface card is needed and one port of the network interface port pair is left "open" without a network interface card. In this manner, the open port allows a spare network interface card to be utilized when work or maintenance is needed on the single network interface card with little or no interruption in service. The single network interface card may be provided in either the first network interface port or the second network interface port of the network interface port pair. The non-redundant configuration is discussed more fully below in connection with FIG. 3.

Finally, high density unit shelf 22 may operate in both the redundant and non-redundant configuration. For example, some network interface port pairs may include two network interface cards and hence operate in the redundant configuration while other network interface port pairs may include only a single network interface card and hence operate in the non-redundant configuration. In this manner, high density unit shelf 22 provides great flexibility in meeting various customer's needs by providing the level of service and reliability desired by the customer. Thus, high density unit shelf 22 provides a flexible configuration that allows a telecommunications provider to provide different levels of service to different types of customers. This allows incremental costs to more closely match incremental revenues.

Figure 2:
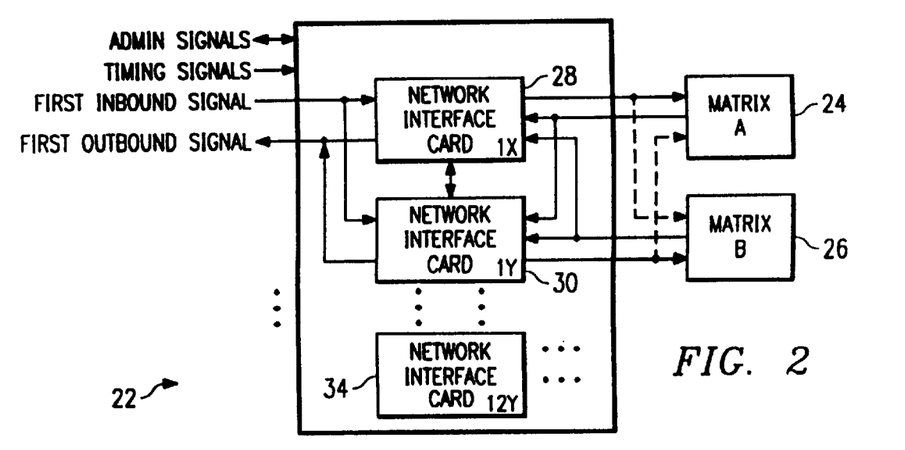
FIG. 2 is an overview block diagram illustrating a high density unit shelf having network interface cards provided in a redundant configuration.

FIG. 2 is an overview block diagram illustrating high density unit shelf 22 with network interface card 28 and network interface card 30 provided in a network interface port pair for redundantly processing an inbound telecommunications signal and an outbound telecommunications signal. The first network interface port is designated at "1X" and the second network interface port is designated as "1Y." High density unit shelf 22 is provided between digital cross-connect system 10 and various telecommunications networks or subnetworks that are coupled to redundant network interface cards such as network interface card 28 and network interface card 30. These various telecommunications networks are not shown in FIG. 2.

High density unit shelf 22 may include any number of additional network interface port pairs for receiving network interface cards and for providing redundant network interfacing. However, for purposes of illustration and discussion, the network interface port pair providing the redundant configuration of network interface card 28 and network interface card 30 is illustrated and discussed as an exemplary network interface port pair configured in a redundant configuration.

As discussed above, high density unit shelf 22 receives redundant control signals from administrative subsystem 12 which can be denoted as "ADMIN SIGNALS" as shown in FIG. 2. These ADMIN SIGNALS are provided throughout high density unit shelf 22 including each network interface port of each of the plurality of network interface port pairs. Similarly, redundant timing signals are provided to high density unit shelf 22 from timing subsystem 14. The timing signals are also provided to each of the various network interface ports of each of the plurality of network interface port pairs. For clarity, the network connectors and matrix connectors of high density unit shelf 22 are not illustrated in FIG. 2 but will normally be provided in an actual implementation of high density unit shelf 22. These connectors are illustrated in FIG. 4 and discussed more fully below.

In operation, the redundant network interface configuration shown in FIG. 2 receives a first inbound telecommunications signal from an attached network at both network interface card 28 and network interface card 30. Each of these network interface cards processes the inbound telecommunications signal and converts it from a first format to a second format, such as a proprietary format, understandable by digital cross-connect system 10 and used by matrix subsystem 16 for switching. The first format may be any of a variety of available digital communications signal formats such as the DS1, E1, DS3, and STS-1 formats. After processing and converting the first inbound telecommunications signal, network interface card 28 provides its output signal to switching fabric 24. Similarly, network interface card 30 provides its output to switching fabric 26. The dashed lines provided at the output of both network interface card 28 and network interface card 30 indicate that high density unit shelf 22 provides paths from each network interface port to both switching fabric 24 and switching fabric 26. This provides additional redundancy and allows either network interface card 28 or network interface card 30 to drive both switching fabric 24 and switching fabric 26 in the event that one of the cards is unavailable or out of service.

When processing an outbound telecommunications signal, both network interface card 28 and network interface card 30 receive an outbound telecommunications signal from both switching fabric 24 and switching fabric 26. Each of these outbound telecommunications signals may also include other information such as parity information and other information that indicates the quality of the provided outbound telecommunications signal. The quality indication information may then be used by each of the network interface cards to decide which outbound telecommunications signal should be processed, converted, and communicated as a first outbound telecommunications signal as illustrated in FIG. 2. Both network interface card 28 and network interface card 30 decide which of the input outbound telecommunications signals to process. Once chosen, each network interface card converts the chosen outbound telecommunications signal from the second format to the first format and generates a first outbound telecommunications signal. At this point, either network interface card 28 or network interface card 30 will be designated as the primary or active card that will provide its output as the first outbound telecommunications signal that is then provided to the coupled or attached network. This decision may be made either locally at network interface card 28 and network interface card 30 or by the administrative subsystem 12 through the redundant control signals provided to each network interface control port pair.

As illustrated in FIG. 2, each network interface port of the illustrated network interface port pair are coupled to one another so that network interface card 28 and network interface card 30 may exchange information as needed. For example, network interface card 28 may provide control or administrative signals to network interface card 30 through this direct connection. This would be especially beneficial if for some reason network interface card 30 was unable to directly receive the control signals from administrative subsystem 12. In this manner, the overall reliability and availability of high density unit shelf 22 is further enhanced.

Figure 3:
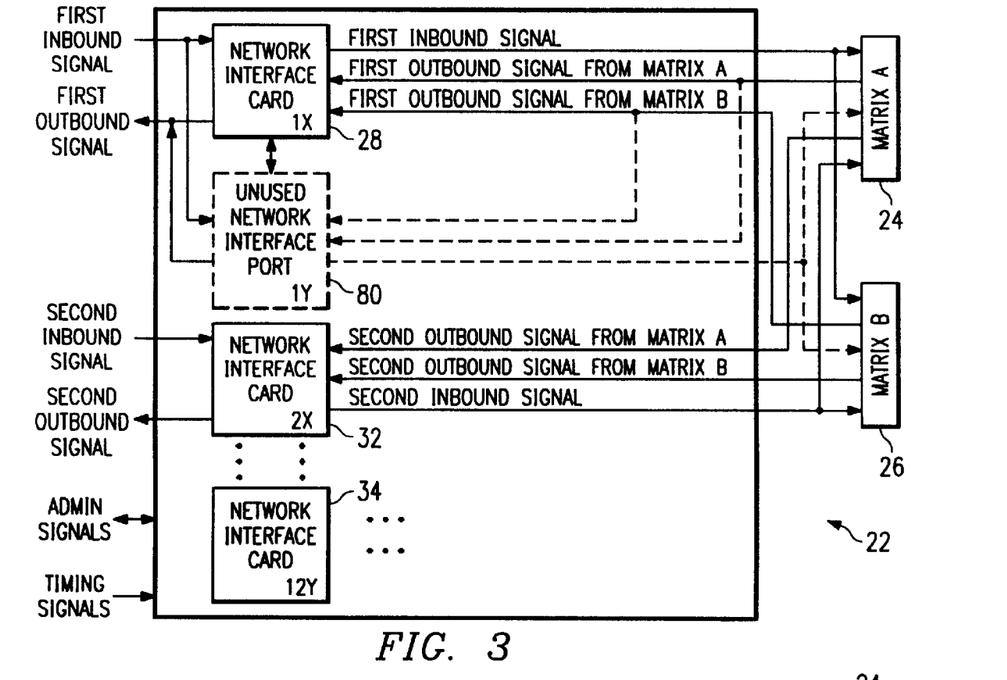
FIG. 3 is an overview block diagram illustrating the high density unit shelf having network interface cards provided in a non-redundant configuration.

A network interface card 34, provided in a second network interface port 12Y of the last network interface port pair, is also illustrated in FIG. 3 and couples between a network and digital cross-connect system 10. The operation of network interface card 34 is the same or similar to that just described above for network interface card 28. The companion first network interface port (not shown in FIG. 2) to network interface port 12Y may or may not be provided with a network interface card. This illustrates the fact the high density unit shelf 22 may be configured in both the redundant and non-redundant configuration.

FIG. 3 is an overview block diagram illustrating high density unit shelf 22 having network interface cards provided in a non-redundant configuration. The non-redundant configuration may be illustrated by examining a network interface port pair that includes only a single network interface card. For example, network interface card 28 is provided in the first network interface port 1X while the second network interface port 1Y, designated with the reference numeral 80, is unused. In this manner, redundant network interface processing does not occur and network interface card 28 provides all the processing for first inbound telecommunications signals and first outbound telecommunications signals.

In operation, network interface card 28 receives a first inbound telecommunications signal and converts the first inbound telecommunications signal from the first format to the second or proprietary format understandable by digital cross-connect system 10. The first inbound telecommunications signal is labeled as first inbound signal and is provided to both switching fabric 24 and switching fabric 26 so that both switching fabrics of matrix subsystem 16 are driven by network interface card 28.

In the outbound direction, network interface card 28 receives a first outbound telecommunications signal from switching fabric 24 and a first outbound telecommunications signal from switching fabric 26. Just as in the redundant configuration, network interface card 28 determines which of these signals provides the necessary integrity or quality to be processed and communicated to the attached network. Once chosen, network interface card 28 processes the first outbound telecommunications signal and converts it from the second or proprietary format to the first format compatible with the coupled network. The first outbound telecommunications signal is then communicated to the attached network.

Unused network interface port 80 provides additional reliability to high density unit shelf 22 even when configured in the non-redundant configuration. For example, unused network interface port 80 provides a path that allows information such as the ADMIN or TIMING signal information be provided from unused second network interface port 80 to the network interface port used by network interface card 28. This enhances overall reliability and availability by providing a redundant or second path for this information to be provided to network interface card 28. Furthermore, the non-redundant configuration reduces incremental costs as only one network interface card need be purchased.

Network interface card 34, provided in a second network interface port 12Y of the last network interface port pair, is also illustrated in FIG. 3 and couples between a network and digital cross-connect system 10. The operation of network interface card 34 is the same or similar to that just described above for network interface card 28. The companion first network interface port (not shown in FIG. 3) to network interface port 12Y may or may not be provided with a network interface card. This, once again, illustrates the fact the high density unit shelf 22 may be configured in both the redundant and non-redundant configuration.

High density unit shelf 22 provides an additional advantage when operating in the non-redundant configuration. In addition to providing a less expensive alternative as compared to the redundant configuration, high density unit shelf 22 provides an unused network interface port for each non-redundant configuration pair. This allows a single spare network interface card to be provided, as needed, for use in any of the unused network interface ports in the event that maintenance is needed on the primary network interface card. For example, high density unit shelf 22 may provide twelve network interface port pairs which allows for twelve non-redundantly configured telecommunications services to be provided. In such a case, a single spare network interface card could be provided which could be used in any of the twelve unused network interface ports so that maintenance could be performed on any one of the existing or primary network interface cards, such as network interface card 28. In this manner, interruption of service is greatly minimized and reduced while allowing for maintenance to be performed.

Figure 4:
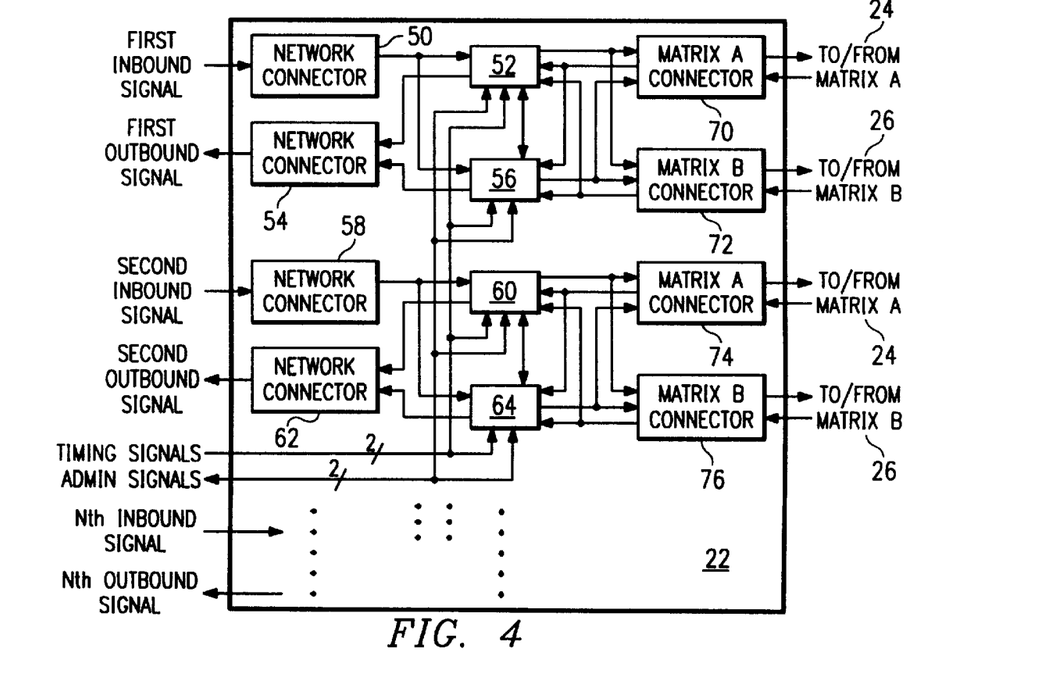
FIG. 4 is a block diagram illustrating the high density unit shelf without network interface cards.

FIG. 4 is a block diagram illustrating high density unit shelf 22 in more detail without the presence of any network interface cards in the network interface ports. High density unit shelf 22 includes a plurality of network interface port pairs. Each network interface port is operable to receive a network interface card and couple between an associated network and a digital switch such as digital cross-connect system 10. Two such network interface port pairs are illustrated in FIG. 4. A first network interface port 52 and a second network interface port 56 comprise a first network interface port pair, while a first network interface port 60 and a second network interface port 64 comprise a second network interface port pair. As was illustrated above, each of these network interface port pairs may contain either one or two network interface cards and operate in either a non-redundant configuration or a redundant configuration, respectively. Also, each network interface port may communicate with the other network interface port of the network interface port pair as illustrated by the double arrow between first network interface port 52 and second network interface port 56 and between first network interface port 60 and second network interface port 64.

In the embodiment of high density unit shelf 22 illustrated in FIG. 4, a network connector pair and a matrix connector pair are coupled to each network interface port pair. The first network interface port pair couples with a receive network connector 50 for receiving a first inbound telecommunications signal from a first network, and a transmit network connector 54 for communicating a first outbound telecommunications signal to the first network.

The second network interface port pair couples with a receive network connector 58 for receiving a second inbound telecommunications signal from a second network, and a transmit network connector 62 for communicating a second outbound telecommunications signal to the second network.

The receive network connectors and the transmit network connectors may be implemented using any of a variety of connectors such as, for example, a sixty-four pin connector, a CHAMP connector, and a bayonet-locking connector (BNC). The receive network connectors and transmit network connectors may also be implemented using dual or multiple connectors per connection such that, for example, receive network connector 50 may include both a CHAMP connector and a BNC connector. This increases the overall versatility of high density unit shelf 22 by providing the capability to handle either a low-speed or a high-speed telecommunications signal at a network interface port pair. In still other embodiments, the receive network connector and the transmit network connector for a network interface port pair may be implemented together as one network connector.

The first network interface port pair also couples with a matrix connector 70 for exchanging both an inbound and an outbound first telecommunications signal between the first network interface port pair and switching fabric 24. The first network interface port pair further couples with a matrix connector 72 for exchanging both an inbound and an outbound first telecommunications signal between the first interface port pair and switching fabric 26. Similarly, the second network interface port pair couples with a matrix connector 74 for exchanging both an inbound and an outbound second telecommunications signal between the second network interface port pair and switching fabric 24. Also, the second network interface port pair couples with a matrix connector 76 for exchanging both an inbound and an outbound second telecommunications signal between the second interface port pair and switching fabric 26. In one embodiment, matrix connector 70, 72, 74, and 76 may couple to the associated network interface ports described above using a parallel bus such as a sixteen-bit parallel bus. Generally, the various matrix connectors of high density unit shelf 22 exchange telecommunications signals with the switch fabrics of matrix subsystem 16 in a second format such as a proprietary format.

As mentioned above, it should be understood that each network interface port of each network interface port pair includes conductive paths or communication paths that allow information to be exchanged between each network interface port of each network interface port pair. For example, the redundant timing signals of high density unit shelf 22 are provided to each network interface port of each network interface port pair. As was mentioned above, timing subsystem 14 provides the redundant timing signals and will generally include redundant timing modules such that two timing signals will be provided to each network interface port. These timing signals may be provided through two separate timing buses that are provided to each network interface port. A first timing signal may be provided through a first timing bus while a second timing signal may be provided through a second timing bus. This is represented by the numeral 2 as is illustrated in FIG. 4. In this manner, high density unit shelf 22 provides enhanced reliability.

The ADMIN SIGNALS or redundant control signals are also provided to each of the network interface ports of high density unit shelf 22. Just as with the timing signals, the ADMIN SIGNALS may be provided using two separate buses to provide further redundancies within high density unit shelf 22. For example, the redundant control signals may be provided through two separate serial control links that couple to each network interface port. The redundant control signals may be provided such that a first serial control link bus may provide a first control signal while a second serial control link bus may provide a second control signal. In this manner, additional redundancies are provided such that if any network interface port fails to receive either the first control signal or the second control signal directly, a communication path is available from the other network interface port of the network interface port pair to provide the redundant control signals. This further increases the reliability and availability of high density unit shelf 22. In other embodiments, the redundant control signals may be provided through two separate parallel control links that couple from administrative subsystem 12 to each network interface port.

The operation of high density unit shelf 22 may best be described by focusing on the first network interface port pair that includes first network interface port 52, second network interface port 56, receive network connector 50, transmit network connector 54, matrix connector 70, and matrix connector 72. A first inbound telecommunications signal is received from a network at receive network connector 50 and provided to both first network interface port 52 and second network interface port 56. The first inbound telecommunications signal will be received from the network in a first format such as the DS1, E1, DS3, and STS-1 formats. The first inbound telecommunications signal will then be converted to a second format by both a first network interface card provided in first network interface port 52 and a second network interface card provided in second network interface port 56. The second format may be any format understandable by an associated digital switch such as a proprietary format compatible with digital cross-connect system 10. Thus, two of the first inbound telecommunications signals are available to be provided to matrix connector 70 and matrix connector 72.

The first inbound telecommunications signals will then be communicated from first network interface port 52 and second network interface port 56 to matrix connector 70 and matrix connector 72. Depending on how the network interface cards are configured, the first inbound telecommunications signal from first network interface port 52 may be provided to matrix connector 70 or both matrix connector 70 and matrix connector 72. Similarly, and also depending on how the network interface cards are configured, the first inbound telecommunications signal from second network interface port 56 may be provided to matrix connector 72 or both matrix connector 72 and matrix connector 70. Matrix connector 70 then provides the signal it receives to a designated switching fabric such as switching fabric 24.

Matrix connector 72 also provides the signal it receives to a designated switching fabric such as switching fabric 26.

High density unit shelf 22 receives a first outbound telecommunications signal at matrix connector 70 from a switching fabric such as switching fabric 24, and a first outbound telecommunications signal at matrix connector 72 from a switching fabric such as switching fabric 26. Thus, in one embodiment, redundant and distinct outbound telecommunications signals are received by high density unit shelf 22. Both of these outbound signals are provided in the second format discussed above. Depending on how the network interface cards are configured, matrix connector 70 may provide the first outbound telecommunications signal received from switching fabric 24 to only first network interface port 52 or both first network interface port 52 and second network interface port 56. Similarly, and also depending on how the network interface cards are configured, matrix connector 72 may provide the first outbound telecommunications signal received from switching fabric 26 to only first network interface port 56 or both first network interface port 56 and second network interface port 52.

At this point, each network interface card converts the outbound telecommunications signal it receives from the second format to the first format. Both of theses signals may then be communicated to transmit network connector 54 where the signal will be provided to the network. Although both network interface port 52 and network interface port 56 may provide a first outbound telecommunications signal to transmit network connector 54, only one will provide a signal. This choice may be decided in real-time or using firmware or software control. In other embodiments, receive network connector 50 and transmit network connector 54 may be implemented as a single network connector.

Thus, it is apparent that there has been provided, in accordance with the present invention, a high density unit shelf and method for manufacturing that satisfies the advantages set forth above. Although the present invention has been described in detail, it should be understood that various changes, substitutions, and alterations can be made herein. For example, the present invention may be operated in redundant mode, non-redundant mode, or a combination of both redundant mode and non-redundant mode. Furthermore, the direct connections illustrated herein could be altered by one skilled in the art such that two devices are merely coupled to one another through an intermediate device or devices without being directly connected while still achieving the desired results demonstrated by the present invention. For example, first network interface port 52 may couple with receive network connector 50 and matrix connector 70 through an intermediate device or element without departing from the present invention. Furthermore, although the present invention has been illustrated and described as being used with a digital cross-connect system, such as a DSC digital cross-connect system, it should be understood that the present invention is not limited to being used with any one particular digital cross-connect system and may in face be practiced with virtually any digital switch. Other examples of changes, substitutions, and alterations are readily ascertainable by one skilled in the art and could be made without departing from the spirit and scope of the present invention as defined by the following claims.

What is claimed is:

1. A high density unit shelf for use with a digital cross-connect system of a telecommunications network and having redundant interface capability, the high density unit shelf comprising:

a network interface port pair operable to receive a first network interface card at a first network interface port and a second network interface card at a second network interface port;

a network connector assembly operable to receive an inbound telecommunications signal in a first format from a network and to couple the inbound telecommunications signal to the first network interface port and the second network interface port, the network connector assembly operable to receive an outbound telecommunications signal in the first format from the first network interface port and the second network interface port and to provide the outbound telecommunications signal to the network;

a first matrix connector operable to receive an inbound telecommunications signal in a second format from the first network interface port and an inbound telecommunications signal in the second format from the second network interface port and to provide the inbound telecommunications signal to a first matrix of the digital cross-connect system; and a second matrix connector operable to receive the inbound telecommunications signal in the second format from the first network interface port and the inbound telecommunications signal in the second format from the second network interface port and to provide the inbound telecommunications signal to a second matrix of the digital cross-connect system.

2. The high density unit shelf of claim 1, wherein the first matrix connector is further operable to receive an outbound telecommunications signal in the second format from the first matrix and to provide the outbound telecommunications signal from the first matrix to the first network interface port and the second network interface port, and wherein the second matrix connector is further operable to receive an outbound telecommunications signal in the second format from the second matrix and to provide the outbound telecommunications signal from the second matrix to the first network interface port and the second network interface port.

3. The high density unit shelf of claim 1, wherein the network connector assembly receives the outbound telecommunications signal in the first format from the first network interface port and provides this outbound telecommunications signal to the network.

4. The high density unit shelf of claim 1, wherein the network connector assembly receives the outbound telecommunications signal in the first format from the second network interface port and provides this outbound telecommunications signal to the network.

5. The high density unit shelf of claim 1, wherein the first matrix connector receives the inbound telecommunications signal in the second format from the first network interface port and provides this signal to the first matrix, and the second matrix connector receives the inbound telecommunications signal in the second format from the second network interface port and provides this signal to the second matrix.

6. The high density unit shelf of claim 1, wherein both the first matrix connector and the second matrix connector receive the inbound telecommunications signal in the second format from the first network interface port, the first matrix connector provides this signal to the first matrix and the second matrix connector provides this signal to the second matrix.

7. The high density unit shelf of claim 1, wherein both the first matrix connector and the second matrix connector receive the inbound telecommunications signal in the second format from the second network interface port, the first matrix connector provides this signal to the first matrix and the second matrix connector provides this signal to the second matrix.

8. The high density unit shelf of claim 1, further comprising:

a plurality of network interface port pairs each with a corresponding network connector assembly and matrix connectors.

9. The high density unit shelf of claim 8, wherein the plurality of network interface port pairs include twelve network interface port pairs.

10. The high density unit shelf of claim 8, wherein each one of the network interface ports of each one of the plurality of network interface port pairs are adjacent to the network interface port of the pair.

11. The high density unit shelf of claim 1, wherein the network connector assembly includes:

a receive network connector operable to receive the inbound telecommunications signal in the first format from the network and to couple the inbound telecommunications signal to the first network interface port and the second network interface port; and a transmit network connector operable to receive the outbound telecommunications signal in the first format from the first network interface port and the second network interface port and to couple the outbound telecommunications signal to the network.

12. The high density unit shelf of claim 11, wherein the receive network connector and the transmit network connector are implemented using a sixty-four pin connector.

13. The high density unit shelf of claim 11, wherein the receive network connector and the transmit network connector are implemented using a CHAMP connector.

14. The high density unit shelf of claim 11, wherein the receive network connector and the transmit network connector are implemented using a bayonet-locking connector.

15. The high density unit shelf of claim 11, wherein the receive network connector and the transmit network connector are implemented using both a bayonet-locking connector and a sixty-four pin connector to provide the capability to handle either a low-speed or a high-speed telecommunications signal.

16. The high density unit shelf of claim 1, wherein the network connector assembly is a single connector.

17. The high density unit shelf of claim 1, wherein the network interface port pair is operable to receive a redundant control signal from an administrative subsystem of the digital cross-connect system.

18. The high density unit shelf of claim 17, wherein the redundant control signal includes a first control signal and a second control signal and the redundant control signal is provided to both the first network interface port and the second network interface port.

19. The high density unit shelf of claim 18, wherein the first control signal is provided to the first network interface port and the second network interface port through a first serial control link bus of the digital cross-connect system and the second control signal is provided to the first network interface port and the second network interface port through a second serial control link bus of the digital cross-connect system.

20. The high density unit shelf of claim 19, wherein the first network interface port is further operable to receive the first control signal and the second control signal from the second network interface port, and wherein the second network interface port is further operable to receive the first control signal and the second control signal from the first network interface port.

21. The high density unit shelf of claim 19, wherein the first serial control link and the second serial control link are provided from the administrative subsystem of the digital cross-connect system using parallel buses.

22. The high density unit shelf of claim 1, wherein the network interface port pair is operable to receive a redundant timing signal from a timing subsystem of the digital cross-connect system.

23. The high density unit shelf of claim 22, wherein the redundant timing signal includes a first timing signal and a second timing signal both provided to the first network interface port and the second network interface port.

24. The high density unit shelf of claim 1, wherein the first matrix connector couples to the first network interface port and the second network interface port through a parallel bus, and the second matrix connector couples to the first network interface port and the second network interface port through a parallel bus.

25. The high density unit shelf of claim 24, wherein the first parallel bus and the second parallel bus are sixteen bit parallel buses.

26. A high density unit shelf comprising:
a plurality of network interface port pairs, each network interface port pair operable to receive a first network interface card at a first network interface port and a second network interface card at a second network interface port;
a plurality of network connector assemblies, each network connector assembly operable to communicate an inbound telecommunications signal to the first network interface port and the second network interface port, each network connector assembly operable to communicate an outbound telecommunications signal from either the first network interface port or the second network interface port;
a plurality of first matrix connectors, each first matrix connector operable to communicate an inbound telecommunications signal from the first network interface port and the second network interface port to a first matrix of a digital switch; and
a plurality of second matrix connectors, each second matrix connector operable to communicate an inbound telecommunications signal from the first network interface port and the second network interface port to a second matrix of the digital switch.

27. The high density unit shelf of claim 26, wherein each one of the plurality of first matrix connectors are further operable to communicate an outbound telecommunications signal from the first matrix to the first network interface port and the second network interface port, and wherein each one of the plurality of second matrix connectors are further operable to communicate an outbound telecommunications signal from the second matrix to the first network interface port and the second network interface port.

28. The high density unit shelf of claim 26, wherein each first matrix connector receives the inbound telecommunications signal from the first network interface port and provides this signal to the first matrix, and each second matrix connector receives the inbound telecommunications signal from the second network interface port and provides this signal to the second matrix.

29. The high density unit shelf of claim 26, wherein each first matrix connector and each second matrix connector receive the inbound telecommunications signal from the first network interface port, the first matrix connector provides this signal to the first matrix and the second matrix connector provides this signal to the second matrix.

30. The high density unit shelf of claim 26, wherein each first matrix connector and each second matrix connector receive the inbound telecommunications signal from the second network interface port, the first matrix connector provides this signal to the first matrix and the second matrix connector provides this signal to the second matrix.

31. The high density unit shelf of claim 26, wherein each network connector assembly includes:
a receive network connector operable to communicate the inbound telecommunications signal to the first network interface port and the second network interface port; and
a transmit network connector operable to communicate the outbound telecommunications signal from either the first network interface port or the second network interface port.

32. A method for manufacturing a high density unit shelf that may be used with a digital cross-connect system and that provides redundant interface capability, the method comprising the steps of:
providing a network interface port pair, the network interface port pair operable to receive a first network interface card at a first network interface port and a second network interface card at a second network interface port;
coupling a receive network connector between a network and the first network interface port and the second network interface port, the receive network connector operable to receive an inbound telecommunications signal in a first format from the network and to communicate the inbound telecommunications signal to the first network interface port and the second network interface port;
coupling a transmit network connector between the network and the first network interface port and the second network interface port, the transmit network connector operable to receive an outbound telecommunications signal in a first format from the first network interface port or the second network interface port and to communicate the outbound telecommunications signal to the network;
coupling a first matrix connector between a first matrix of the digital cross-connect system and the first network interface port and the second network interface port, the first matrix connector operable to receive an inbound telecommunications signal in a second format from the first network interface port and an inbound telecommunications signal in the second format from the second network interface port and to provide the inbound telecommunications signal to the first matrix of the digital cross-connect system; and
coupling a second matrix connector between a second matrix of the digital cross-connect system and the first network interface port and the second network interface port, the second matrix connector operable to receive an inbound telecommunications signal in a second format from the first network interface port and an inbound telecommunications signal in the second format from the second network interface port and to provide the inbound telecommunications signal to the second matrix of the digital cross-connect system.

33. The method of claim 32, wherein the first matrix connector is further operable to receive an outbound telecommunications signal in the second format from the first matrix and to provide the outbound telecommunications signal from the first matrix to the first network interface port and the second network interface port, and wherein the second matrix connector is further operable to receive an outbound telecommunications signal in the second format from the second matrix and to provide the outbound telecommunications signal from the second matrix to the first network interface port and the second network interface port.

34. The method of claim 32, wherein the transmit network connector receives the outbound telecommunications signal in the first format from the first network interface port and provides this outbound telecommunications signal to the network.

35. The method of claim 32, wherein the transmit network connector receives the outbound telecommunications signal in the first format from the second network interface port and provides this outbound telecommunications signal to the network.

36. The method of claim 32, wherein the first matrix connector receives the inbound telecommunications signal in the second format from the first network interface port and the second matrix connector receives the inbound telecommunications signal in the second format from the second network interface port.

37. The method of claim 32, wherein both the first matrix connector and the second matrix connector receive the inbound telecommunications signal in the second format from the first network interface port.

38. The method of claim 32, wherein both the first matrix connector and the second matrix connector receive the inbound telecommunications signal in the second format from the second network interface port.

* * * * *